(12) United States Patent
Hanam (10) Patent No.: US 7,075,895 B1
(45) Date of Patent: Jul. 11, 2006

(54) SYSTEM AND METHOD FOR FACILITATING DISCOVERY OF NETWORK ADDRESSES AND SELECTED CHARATERISTICS OF COMPUTER SYSTEMS AND THE LIKE WHICH ARE CONNECTED IN DIGITAL DATA NETWORKS

(75) Inventor: Gerald J. Hanam, Framingham, MA (US)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

(21) Appl. No.: 09/206,097

(22) Filed: Dec. 4, 1998

(51) Int. Cl.
*H04L 12/28* (2006.01)

(52) U.S. Cl. .................. 370/254; 370/389; 709/224
(58) Field of Classification Search ................ 370/254, 370/255, 256, 257, 258, 389, 392, 428, 465; 709/200, 220, 221, 222, 223, 224, 225, 226, 709/101
See application file for complete search history.

(56) References Cited

U.S. PATENT DOCUMENTS

| | | | | |
|---|---|---|---|---|
| 5,710,885 A | * | 1/1998 | Bondi | 709/224 |
| 5,761,507 A | * | 6/1998 | Govett | 709/101 |
| 5,805,818 A | * | 9/1998 | Perlman et al. | 709/224 |
| 6,249,814 B1 | * | 6/2001 | Shaffer et al. | 709/223 |
| 6,360,260 B1 | * | 3/2002 | Compliment et al. | 709/224 |
| 6,418,466 B1 | * | 7/2002 | Bertram et al. | 709/221 |
| 6,496,859 B1 | * | 12/2002 | Roy et al. | 709/223 |
| 6,549,932 B1 | * | 4/2003 | McNally et al. | 709/202 |
| 6,556,574 B1 | * | 4/2003 | Pearce et al. | 370/401 |
| 6,590,895 B1 | * | 7/2003 | Gupta et al. | 370/394 |

* cited by examiner

*Primary Examiner*—Douglas Olms
*Assistant Examiner*—Ricardo M. Pizarro
(74) *Attorney, Agent, or Firm*—Beyer Weaver & Thomas, LLP (57) ABSTRACT

A system for use by a computer to determine which network addresses are being used by other computers or other devices in a network includes an address inquiry message packet generator module configured to enable the computer to transmit address inquiry message packets over a network in one or more iterations. Each address inquiry message packet includes a network address. The address inquiry message packet generator module is configured to enable the computer to transmit address inquiry message packets for a selected number of network addresses during each iteration. An iteration control module is configured to control the timing of successive iterations of transmission of address inquiry message packets by the computer in relation to reception by the computer of response message packets responding to the address inquiry message packets. The iteration control module is configured to enable the computer to provide at least a minimum time period for each iteration, and to extend the time period if the computer receives response message packets during the iteration. In addition, the iteration control module is configured to adjust the minimum time period in relation to the time delay between the time the computer transmits address inquiry message packets and the time it receives respective address inquiry message packets responsive thereto. In addition, after receiving a response message packet from a device, the computer can determine predetermined characteristics in connection therewith, including whether it is running a port mapper.

33 Claims, 8 Drawing Sheets

SYSTEM AND METHOD FOR FACILITATING DISCOVERY OF NETWORK ADDRESSES AND SELECTED CHARATERISTICS OF COMPUTER SYSTEMS AND THE LIKE WHICH ARE CONNECTED IN DIGITAL DATA NETWORKS

FIELD OF THE INVENTION

The invention relates generally to the field of digital data networks, and more particularly to systems and methods for facilitating discovery of network addresses and selected characteristics of computer systems and the like which are connected to such networks.

BACKGROUND OF THE INVENTION

In modern "enterprise" digital data processing systems, that is, computer systems for use in an office environment in a company, a number of personal computers, workstations, and other devices such as mass storage subsystems, network printers and interfaces to the public telephony system, are typically interconnected in a computer network. The personal computers and workstations (generally, "computers") are used by individual users to perform processing in connection with data and programs that may be stored in the network mass storage subsystems. In such an arrangement, the computers, operating as clients, access the data and programs from the network mass storage subsystems for processing. In addition, the computers will enable processed data to be uploaded to the network mass storage subsystems for storage, to a network printer for printing, to the telephony interface for transmission over the public telephony system, or the like. In such an arrangement, the network mass storage subsystems, network printers and telephony interface operate as servers, since they are available to service requests from all of the clients in the network. By organizing the network in such a manner, the servers are readily available for use by all of the computers the network. Such a network may be spread over a fairly wide area, with the computers being interconnected by communication links such as electrical wires or optic fibers.

A problem arises when an operator at one computer wishes to enable the computer to determine network addresses that are used by other computers and other resources (generally, "computers") for communications over the network, and selected characteristics of those computers. For example, an operator of one computer connected to the network may wish to use programs or data which are on other computers (including both client computers and server computers) which are connected to the network, in which case he or she may need to initially obtain the network addresses which identify the particular computers which are connected to the network. After obtaining the identifications, the operator may retrieve information from or transfer information to their respective information storage systems. In addition, after obtaining the identifications the operator which may enable ones of the other computers to perform, for example, processing operations in connection with remote procedure calls (RPC's) transmitted thereto over the network.

Several general methodologies have been used to enable an operator to determine the various computers which are available over the network. In one methodology, each computer can be provided with one or more lists of other computers and other resources which are available to it over the network. In such a case, the list would need to be updated by, for example, a system administrator as each computer or other resource is added to or removed from the network. There are several problems with this methodology. First, maintaining all of the lists in an updated condition can be a difficult task, particularly as the size of the network increases and computers and other resources are added or removed in remote portions of the network. In addition, such lists would normally only identify the particular computers and resources which are connected to the network, and would not necessarily indicate whether they are available for use at any particular point in time; thus, for example, if a particular computer or other resource is switched off, it would still be identified in a list but would not actually then be available.

In another methodology, each computer periodically broadcasts "advertising" messages containing their respective identifications over the network, perhaps along with other information such as various types of resources that they may provide which may be accessed over the network. The various computers can receive the broadcast messages and from the information contained therein can identify the computers and other resources which broadcast the respective messages. The computers can buffer the information that they receive in the respective broadcast messages and provide it to the operator when requested. Since new computers may be added to the network, the computers which broadcast the messages will need to broadcast them periodically over the network. While this methodology allows each computer to identify other computers which are available over the network, without requiring assistance from a system administrator or other operator, it does require the computers and other resources to broadcast a number of messages. A number of the broadcast messages may be unnecessary, either because the computers and other resources which are connected to and available over the network has not changed, or because operators have not requested information as to the computers and resources which are available over the network. This problem is exacerbated as the number of computers which are connected to the network increases, since the number of advertising messages would increase correspondingly and reduce the network bandwidth which is available for transfer of other information over the network. Additionally for networks which are interconnected by devices such as routers, the broadcast advertising messages may not be transferred throughout the entire network, since typically routers are designed so as not to forward broadcast messages.

A further methodology has been developed which alleviates these problems to some extent. In this further methodology, when an operator at a computer wishes to know what other computers and other resources are available over the network, his or her computer will broadcast an inquiry message over the network. Other computers connected to the network are to respond to the inquiry message with the required information, including, for example, their respective identifiers, within a particular time-out period. The computer that had broadcast the inquiry message will receive the information can provide the information which it receives during the time-out period to the operator. While this methodology alleviates the transmission of unnecessary messages which will be broadcast in the previously-described methodology, and it ensures that the information provided to the operator is current, it does have several problems. First, the requirement that a computer or other resource respond within the time-out period in order for its information to be included in the information displayed to the operator, results in information not being included if it is not received within the required time-out period. Thus, if a computer or other resource is busy and not able to respond to the broadcast message within the time-out period, its information will not be provided to the operator even though it may be available for use. Furthermore, if there are a large number of computers connected to the network which will respond to the broadcast, the computer that broadcast the message may be inundated with response messages, which can cause congestion and lost messages.

To alleviate the congestion problem, instead of a broadcast message, the computer that is determining the network addresses being used by other computers in the network can transmit individual address inquiry message packets using each of the possible network addresses, or a predetermined subset thereof. If another computer receives an address inquiry message packet, it will generate a response message packet for transmission to the computer that transmitted the address inquiry message packet, which response message packet includes its network address. The computer could transmit a single address inquiry message packet, wait for a predetermined time interval, during which it may get a response, and then transmit another address inquiry message packet, and repeat these operations for each network address to be tried. However, operating in this manner can require an unduly long time to complete operations in connection with all of the network addresses to be tried, particularly if the time interval is relatively long; which may be the case if the network is large and worst-case propagation delays may be commensurately large. To accommodate that, the computer can transmit a plurality of address inquiry message packets, and wait for a predetermined time period before sending out additional address inquiry message packets. This can still require an unduly long period of time, particularly if the network is large and the time interval is relatively long.

SUMMARY OF THE INVENTION

The invention provides a new and improved system and method for facilitating efficient determination by a computer connected in a computer network of network addresses used by other computers and other devices connected in the network, and of determining predetermined characteristics of those other computers and other devices.

In brief summary, a system for use by a computer to determine which network addresses are being used by other computers or other devices in a network includes an address inquiry message packet generator module configured to enable the computer to transmit address inquiry message packets over a network in one or more iterations. Each address inquiry message packet includes a network address. The address inquiry message packet generator module is configured to enable the computer to transmit address inquiry message packets for a selected number of network addresses during each iteration. An iteration control module is configured to control the timing of successive iterations of transmission of address inquiry message packets by the computer in relation to reception by the computer of response message packets responding to the address inquiry message packets.

In embodiments of the invention, the iteration control module is configured to enable the computer to provide at least a minimum time period for each iteration, and to extend the time period if the computer receives response message packets during the iteration. In addition, the iteration control module is configured to adjust the minimum time period in relation to the time delay between the time the computer transmits address inquiry message packets and the time it receives respective address inquiry message packets responsive thereto.

In further embodiments of the invention, the computer discovers predetermined characteristics of devices which provide response message packets, including whether they are running a port mapper.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

DETAILED DESCRIPTION OF AN ILLUSTRATIVE EMBODIMENT

Figure 1:
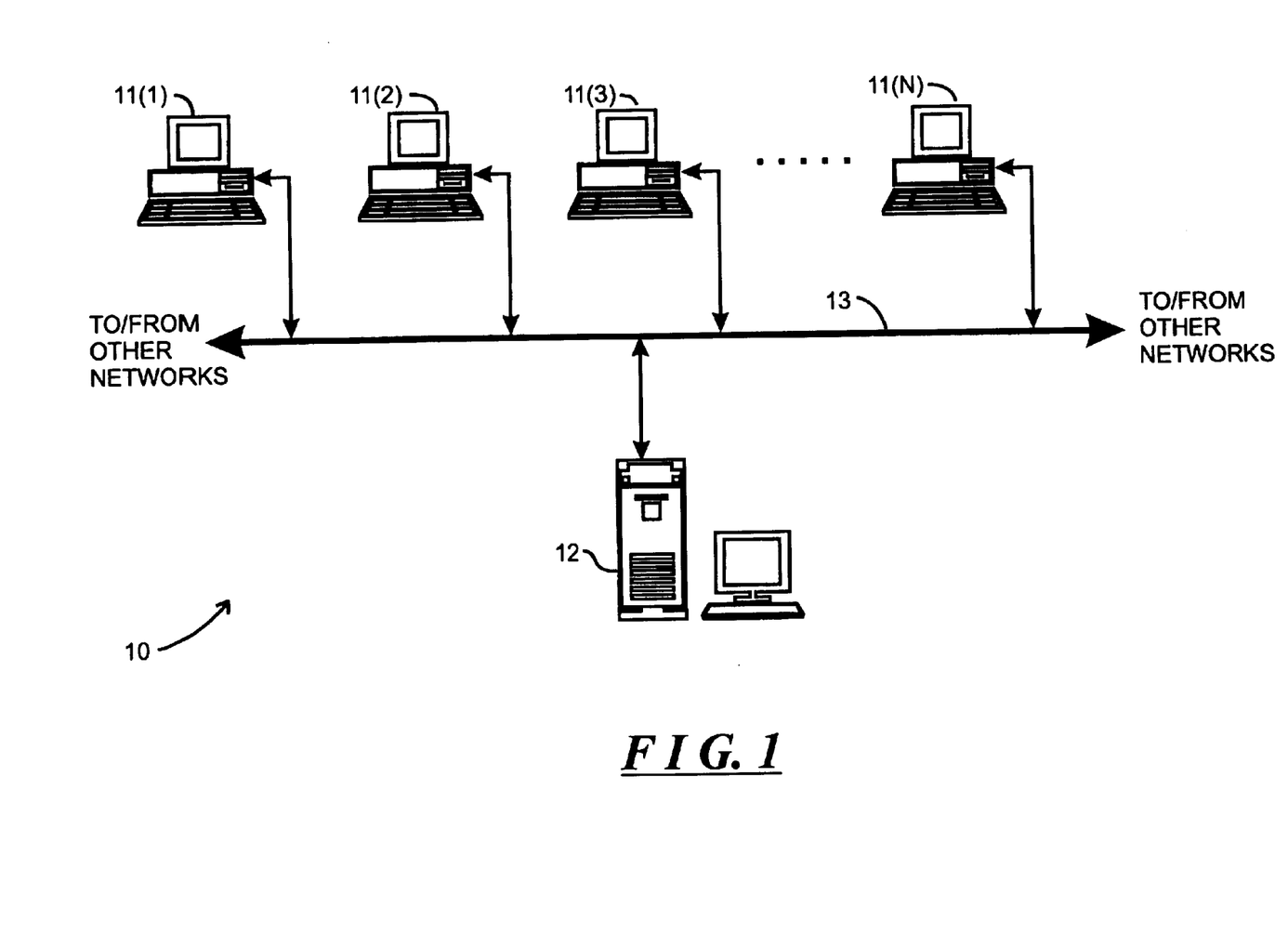
FIG. 1 is a schematic diagram of a computer network including a computer constructed in accordance with the invention.

FIG. 1 depicts a computer network 10 including a computer which, in turn, includes an arrangement for facilitating efficient determination by a computer connected in a computer network of network addresses used by other computers and other devices connected in the network, and of determining predetermined characteristics of those other computers and other devices, constructed in accordance with the invention. With reference to FIG. 1, network 10 includes a plurality of computers 11(1) through 11(N) (generally identified by reference numeral 11(n)) and 12 which are interconnected by a communication link 13. As is conventional, the computers 11(n) and 12 are of the conventional stored-program computer architecture. At least some of the computers 11(n) are in the form of personal computers or computer workstations, each of which includes a system unit, a video display unit and operator input devices such as a keyboard and mouse. The computer 12 also includes a system unit, and may also include a video display unit and operator input devices. A system unit generally includes processing, memory, mass storage devices such as disk and/or tape storage elements and other elements (not separately shown), including network interface elements for interfacing the respective computer system 11(n) or server computer 12 to the communication link 13. A video display unit permits the computer to display processed data and processing status to the user, and an operator input device enable the user to input data and control processing by the computer. The computers 11(n) and 12 transfer information, in the form of messages, through their respective network interface devices among each other over the communication link 13. The communication link 13 interconnecting the client computers 11(n) and server computer 12 in the network 10 may, as is conventional, comprise wires, optical fibers or other media for carrying signals representing information among the computers 11(n) and 12.

In one embodiment, the network 10 is organized in a "client-server" configuration, in which at least one computer, namely, computer 12, operates as a server, and the other computers 11(n) operate as clients. Typically, the servers include large-capacity mass storage devices which can store copies of programs and data which are available for retrieval by the client computers over the communication link 13 for use in their processing operations. From time to time, a client computer system 11(n) may also store data on the server computer 12, which may be later retrieved by it (the client computer that stored the data) or other client computers for use in their processing operations. The server computers may be generally similar to the client computers 11(n), including a system unit, video display unit and operator input devices and may be usable by an operator for data processing operations in a manner similar to a client computer. Alternatively, at least some of the server computers may include only processing, memory, mass storage and network interface elements for receiving and processing retrieval or storage requests from the client computers, and generating responses thereto.

The network 10 may be connected to a plurality of other networks (not shown), each of which may be structured and organized similarly to network 10, to form a unitary "wide area" network. Each network, including network 10, may be divided into a hierarchy comprising a plurality of sections, sub-sections and so forth, which may be illustratively termed "sub-nets," "sub-sub-nets," and so forth, in one or more levels. Each computer system 11(n) and server computer 12 is identified by a network address which is structured to reflect the network division hierarchy. For example, each computer system's network address includes a series of one or more high-order portions, which can identify the particular network, sub-net, sub-sub-net, and so forth, in the hierarchy, and a low-order portion which provides an identification for the particular computer system 11(n) or server computer 12 in the lowest-level sub-net. Thus, each computer system's network address may have a structure $<a_{B_N}^N \ldots a_0^N | a_{B_{N-1}}^{N-1} \ldots a_0^{N-1} | \ldots | a_{B_0}^0 \ldots a_0^0>$, where "$a_{B_N}^N \ldots a_0^N$" corresponds to the series of "$B_N+1$" address bits identifying, for example, the network within the wide-area network, "$a_{B_{N-1}}^{N-1} \ldots a_0^{N-1}$" corresponds to the series of "$B_{N-1}+1$" address bits identifying a second-level sub-net (corresponding to the highest sub-net level in the network hierarchy), and so forth, and the vertical bar "|" indicates that the successive series of address bits are concatenated into a single address. All of the possible binary-encoded values represented by the entire address, that is $<a_{B_N}^N \ldots a_0^0>$, define a network address space, and a computer 11(n) can have any network address in that network address space. Thus, if there are "M" bits in the network address, there will be $2^M$ possible addresses in the address space.

Different networks in a wide-area network may have different numbers of sub-net levels, and different numbers of sets of the bits $<a_{B_{N-1}}^{N-1} \ldots a_0^0>$network-identification level which are allocated to sub-net identification. Indeed, networks in the wide-area network need not have any sub-net levels. In these cases, the computers will have "M" address bits, with the high-order $B_N+1$ bits identifying the network in the wide-area network. However, the other address bits $<a_{B_{N-1}}^{N-1} \ldots a_0^0>$may be allocated to sub-net or other levels (if any) in a manner which may differ from other networks in the wide area network.

Each computer connected to the communication link 13 can transfer information to another computer connected to the communication link by transmitting message packets over the communication link 13. Each message packet includes an address portion which contains the address of the network, sub-net, sub-sub-net, and so forth, as well as the address for the specific computer system 11(n) or server computer 12 which is to receive the message packet. Generally, computers 11(n) which are associated with the same sub-net are typically located proximate one another, such as in the same building or portion of a building. On the other hand, sub-nets associated with the same network may be located in widely-divergent locations.

The invention, in one aspect, provides an efficient network address discovery mechanism by which a computer connected to the network can determine which of the network addresses in the network's address space is used by computers or other resources and devices (generally, "computers") that are connected to the network. In another aspect, the invention provides a mechanism by which the computer, after determining that an address is used by a computer, determines predetermined characteristics of the computer, in particular the types of methods or procedures which are available from the respective computer by means of remote method invocations or RPC (remote procedure calls).

In connection with the first aspect, that is, the determination of the addresses in the address space which are used by other computers, the computer that is attempting to determine those addresses, illustratively, computer 11(n'), transmits a plurality of address inquiry message packets over the communication link 13, each message with one of the possible address from the address space. In one embodiment, in which message packets are transferred over the network using the Internet protocol ("IP"), the address inquiry message packets may be in the form of ICMP (Internet Control Message Packet) echo request, or "ping" packets [see, for example, R. Perlman, *Interconnections: Bridges and Routers*, (Addison-Wesley, 1992) pp. 185–189]. If the address in the address inquiry message packet corresponds to the network address of another computer, such as computer 11(n") (n"≠n') in the network, the other computer 11(n") will generate a response message packet and transmit it back to the computer 11(n'). In the embodiment, when the computer 11(n') receives the response message packet, it will record in, for example, a database, the fact that the address is used by another computer in the network. If the computer 11(n') does not receive a response message packet, the computer 11(n') can, but need not, record the fact that no response message packet was received. The fact that the computer 11(n') did not receive a response message packet may indicate, for example, that no computer is connected to the network which uses the address. However, the fact that the computer 11(n') did not receive a response message packet may indicate that a computer 11(n") connected to the network uses the address but that the computer 11(n") did not receive the address inquiry message packet (and thus would not generate a response message packet) because it (that is, the address inquiry message packet) was lost, or that the computer 11(n") did receive the address inquiry message packet and transmitted a response message packet, but that the computer 11(n') that transmitted the address inquiry message packet did not receive the address inquiry message packet because it (that is, the address inquiry message packet) was lost. To accommodate such possible packet loss, the computer 11(n') may, if it does not receive a response message packet relating to a particular network address within a predetermined time interval after it transmits an address inquiry message packet, at some point later transmit another address inquiry message packet using the same network address. The computer 11(n') may perform these operations several times. If the computer 11(n') receives a response message packet for the network address in response to any of the address inquiry message packets that it transmits, it (that is, the computer 11(n')) will record in its database the fact that the address is used by another computer 11(n") in the network 10.

The computer 11(n'), when it is transmitting address inquiry message packets to determine the network addresses for which other computers are respective destinations, neither (i) waits, after performing all of the operations described above in connection with one network address before transmitting address inquiry message packets for a next network address in the address space, since that could require an unduly long period of time to accommodate all of the network addresses in the address space, nor (i) transmits address inquiry message packets for all possible network address in the address space, since all of the other computers in the network will receive them and transmit response message packets substantially simultaneously, resulting in congestion and likely lost message packets at the computer system 11(n).

Instead, the computer 11(n') transmits address inquiry message packets in a series of iterations. In each iteration, the computer 11(n') transmits a set of address inquiry message packets, each of which is associated with a network address. The computer 11(n') will wait for a time during which it can receive response message packets that are transmitted in response to the address inquiry message packets that were transmitted during the iteration, as well as response message packets that were transmitted in response to any address inquiry message packets that were transmitted during previous iterations but not received during those iterations. In each iteration, the network addresses that are used in the address inquiry message packets are preferably sequential, and may be associated with computers associated with the same sub-net, although, depending on the number of address inquiry message packets transmitted during an iteration, several iterations may be required to transmit address inquiry message packets for all network addresses in a sub-net. In successive iterations, the address inquiry message packets will preferably be from successive sequences of network addresses in the network address space.

In accordance with the invention, the amount of time that the computer 11(n') waits after transmitting a set of address inquiry message packets during an iteration before it begins transmitting address inquiry message packets for the next iteration may vary. The amount of time that the computer 11(n') will wait before it begins transmitting the next set of address inquiry message packets depends on whether it receives, during an initial minimum time period, any response message packets for the set of message packets that it transmitted during the iteration.

If, during an iteration, the computer 11(n') does receive at least one such response message packet for the address inquiry message packets transmitted at the beginning of the iteration, but not response message packets for all of the address inquiry message packets, it can wait for an additional incremental time period before beginning the next iteration. If, during the additional incremental time period, the computer 11(n') again receives at least one response message packet for the set of address inquiry message packets transmitted at the beginning of the iteration, and if it has not received response message packets for all such address inquiry message packets, it can wait for yet another incremental time period. These operations can be repeated through additional incremental time periods, up to a predetermined maximum time period. On the other hand, if, during the initial minimum time period, the computer 11(n') does not receive any response message packets for the inquiry message packets that it transmitted at the beginning of the iteration, it can begin the next iteration and transmit the next set of address inquiry message packets. Similarly, if, during any incremental time period after the minimum time period, the computer 11(n') does not receive a response message packet for the address inquiry message packets that it transmitted at the beginning of the iteration, it can at that point begin the next iteration and transmit the next set of address inquiry message packets. In any case, the computer 11(n') will begin the next iteration no later than the maximum time period. Thus, the amount of time that the computer 11(n') will wait, after it transmits the address inquiry message packets for one iteration, before beginning transmission of address inquiry message packets for the next iteration, can vary from a minimum time period to a maximum time period, in increments defined by the incremental time period, depending on whether the computer 11(n') receives, during the minimum time period or each successive incremental time period, a response message packet responding to an address inquiry message packet transmitted at the beginning of the iteration.

For any response message packets that the computer 11(n') receives during the iteration, including response message packets which were in response to address inquiry message packets that transmitted by the computer 11(n') during a previous iteration, it (that is, the computer 11(n')) will receive them (that is, the response message packets) and record the network addresses in the response message packets as being used by computers 11(n"), (11n'''), . . . , (n''', n'''≠n') on the network.

These operations continue until the computer 11(n') has transmitted address inquiry message packets for all of the network addresses in the network address space. For network addresses for which the computer 11(n') did not receive response messages packets in response to address inquiry message packets, the computer 11(n') can perform a retry operation during which it repeats the above-described operations in connection with those network addresses. It will be appreciated that the computer 11(n') may, during the retry operation, receive response message packets in response to address inquiry message packets which it had previously transmitted during the original operation; in that case, the computer 11(n') can record the network address associated with the response message packet as being used in the same manner as it would with response message packets in response to address inquiry message packets which were transmitted during the retry operation. The computer 11(n') can repeat these operations through a predetermined maximum number of retry operations, performing each retry operation in connection with network addresses for which it has not previously received response message packets.

A benefit of adjusting the length of the time period is as follows. Typically, the address space of a network is relatively sparsely populated, that is, there are relatively few network addresses which are actually being used by computers and other devices which are connected to the network. However, those network addresses which are used are generally clustered and within a cluster the network addresses which are used are relatively thickly populated. For unpopulated regions of the network address space, during each iteration the computer 11(n') will only wait for the initial minimum time period before beginning the next iteration and so, if the initial minimum time period is a relatively small portion of the maximum time period, the iterations will be relatively short and the computer 11(n') to sequence through those unpopulated regions relatively quickly. However, when the computer 11(n'), during an iteration, is operating in a relatively thickly populated region of the network's address space, by increasing the time period incrementally while the computer 11(n') is receiving response message packets, before sending out the next set of address inquiry message packets for the next iteration, the computer 11(n') will have more time to receive and process the response message packets which it receives during the iteration, effectively adapting the time period (either the initial minimum time period or the initial period as incremented) which the computer 11(n') will wait before sending the next set of address inquiry messages for the next iteration. This can reduce the congestion at the computer 11(n') and also reduce the likelihood of lost response message packets. In addition, making sure that the computer 11(n') does not wait beyond the maximum time period before transmitting address inquiry message packets for the next iteration ensures that it (that is, the computer 11(n')) does not wait too long before starting the next iteration, which can also unduly extend the network address discovery operation.

As a refinement, the initial minimum time period used by the computer 11(n') can also vary. In that connection, when for each sub-net, the computer 11(n') maintains a running average for the round-trip time for message packets, from the time the address inquiry message packets are transmitted to the time any response message packets are received. If the running average round-trip time exceeds either the minimum time period, or the time period as incremented as described above, for the next iteration the computer 11(n') will set as the minimum time period the current minimum time period incremented by the incremental time period, provided the new minimum time period does not exceed the maximum time period. The computer 11(n') will use that incremented initial minimum time period as the initial minimum time period during the next iteration. As noted above, within a populated cluster of the network's address space, the network addresses are relatively thickly populated. Typically, each such cluster will be associated with a sub-net, sub-sub-net, and so forth (generally, "sub-net"). Since a sub-net may be relatively close to, or distant from, the sub-net to which includes computer 11(n'), the propagation delay for address inquiry message packets and respective response message packets may be correspondingly short or long. After the computer 11(n') has completed one or more iterations during which it transmits address inquiry message packets for network addresses in a cluster associated with a sub-net, it will reset the initial minimum time interval to the predetermined initial minimum time interval. If the computer 11(n'), during an iteration in connection with network addresses which are associated with a sub-net, determines that it has received response message packets for which the running average round trip time exceeds the current minimum time period, it is likely that the sub-net for which it is currently transmitting address inquiry message packets is relatively distant, with a correspondingly long propagation delay. In that case, adjusting the initial minimum time delay as described above will serve to adapt the initial minimum time interval to accommodate the increased propagation delay on a sub-net by sub-net basis. Resetting the initial minimum time interval after finishing iterations in connection with a sub-net will ensure that the initial minimum time interval does not remain at the incremented length for iterations during which address inquiry message packets are transmitted using network addresses in unpopulated regions of the network address space or using network addresses for sub-net for which the propagation delay is relatively short.

In another aspect of the invention, the computer 11(n'), after determining at least one network address in the network address space which used by another computer 11(n") (n"≠n'), can efficiently determine predetermined characteristics of the other computer. In that connection, the computer 11(n') determines whether the other computer 11(n") is running a port mapper, which is useful in connection with requesting processing services from the other computer 11(n") by way of a remote procedure call ("RPC"). The computer 11(n') determines whether the other computer 11(n") is running a port mapper by transmitting a message packet therefor, and so it can perform these operations at any time after it determines that another computer 11(n") is using a particular network address as described above. In one embodiment, the computer 11(n') can perform operations in connection with the second aspect on an interleaved basis with the operations described above in connection with the first aspect.

Figure 2:
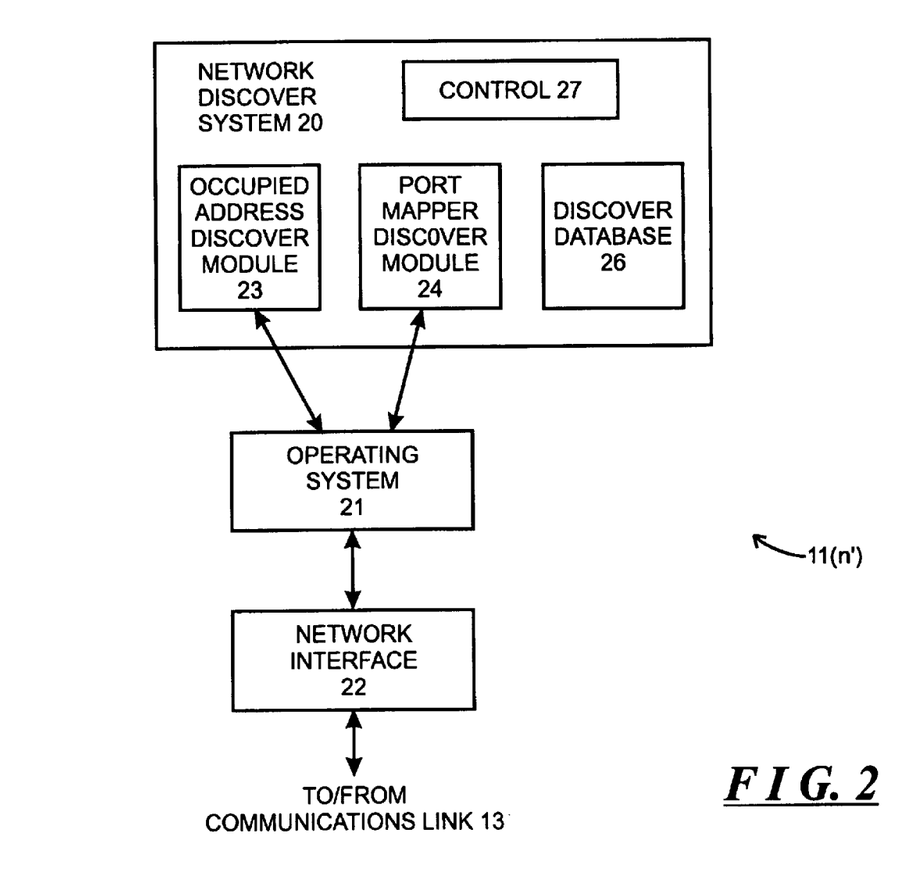
FIG. 2 is a functional block diagram of a computer useful in the network depicted in FIG. 1 including an arrangement for facilitating efficient determination by a computer connected in a computer network of network addresses used by other computers and other devices connected in the network, and of determining predetermined characteristics of those other computers and other devices, constructed in accordance with the invention.

FIG. 2 depicts a functional block diagram of components of the computer 11(n') which are related to the invention as described above. With reference to FIG. 2, the computer 11(n') includes a network discover system 20, an operating system 21 and an network interface 22. The computer 11(n') can also include other components (not shown) which are conventional in a computer, including components for performing processing operations, storing information, receiving information from an operator or displaying information to an operator and the like. The network interface 22 transmits message packets over, and receives message packets from, the communication link 13 (FIG. 1). The network interface 22 can receive message packets, including address inquiry message packets, to be transmitted from the operating system 21, and provide message packets received from the communication link 13 to the operating system 21. The operating system 21, in turn, will generally receive information to be transferred in message packets from other components in the computer 11(n'), including the network discover system 20. After the operating system 21 receives the information to be transferred it generates the message packets, which it provides to the network interface 22 for transfer over the communication link 13. For message packets received from the network interface 22, the operating system 21 will determine the appropriate component, as network discover system 20, which is to receive the information, and provide the information thereto.

The network discover system 20 includes an occupied address discover module 23, a port mapper discover module 24, and a discover database 26, all of which operate under control of a control module 27. The discover database 26 stores information concerning aspects of the network which have been determined by the network discover module system 20, including, in connection with the invention, the network addresses of the network address space which are occupied, that is, for which there are computers which are identified thereby, and whether each such computer is running a port mapper. The occupied address discover module 23 controls transmission of address inquiry message packets, and receives information related to response message packets and loads occupied network address information into the discover database 26. The port mapper discover module 24 uses the occupied network address information from the discover database 26 to control generation of port mapper status request message packets for the occupied network addresses, and receives information responsive thereto, which it stores in the discover database 26.

As noted above, the control module 27 control the occupied address discover module23, and port mapper discover module 24. In particular, the control module 27 will receive, either from an operator through an user interface, or from another component, such as a program (not shown) being executed by the computer 11(n'), identification of the portion or portions of the network address space for which address inquiry message packets are to be generated, and enable the occupied address discover module 23 to operate in connection therewith. In one embodiment, the control module 27 may provide the information as to the portion or portions of the network address space to the occupied address discover module 23 in the form of address space ranges or in the form of a table of network addresses, or both. Details of operations performed by the occupied address discover module 23 in generating address inquiry message packets, receiving response message packets and storing occupied network address information in the discover database, will be described below in connection with FIGS. 3A through 3F.

The port mapper discover module 24 determines whether computers, which occupy network addresses discovered by the occupied address discover module 23, are running respective port mappers. In that operation, the port mapper discover module 24 enables, for respective occupied network addresses, the generation of RPC (remote procedure call) null message packets, which are transmitted by the network interface 22 over the communication link 13. For each RPC null message packet, the computer 11(n") that receives the packet will respond and condition a flag in the response indicating whether it (that is, the computer 11(n")) is running a port mapper. The port mapper discover module 24 can store that information in the discover database 26.

Figure 3A:
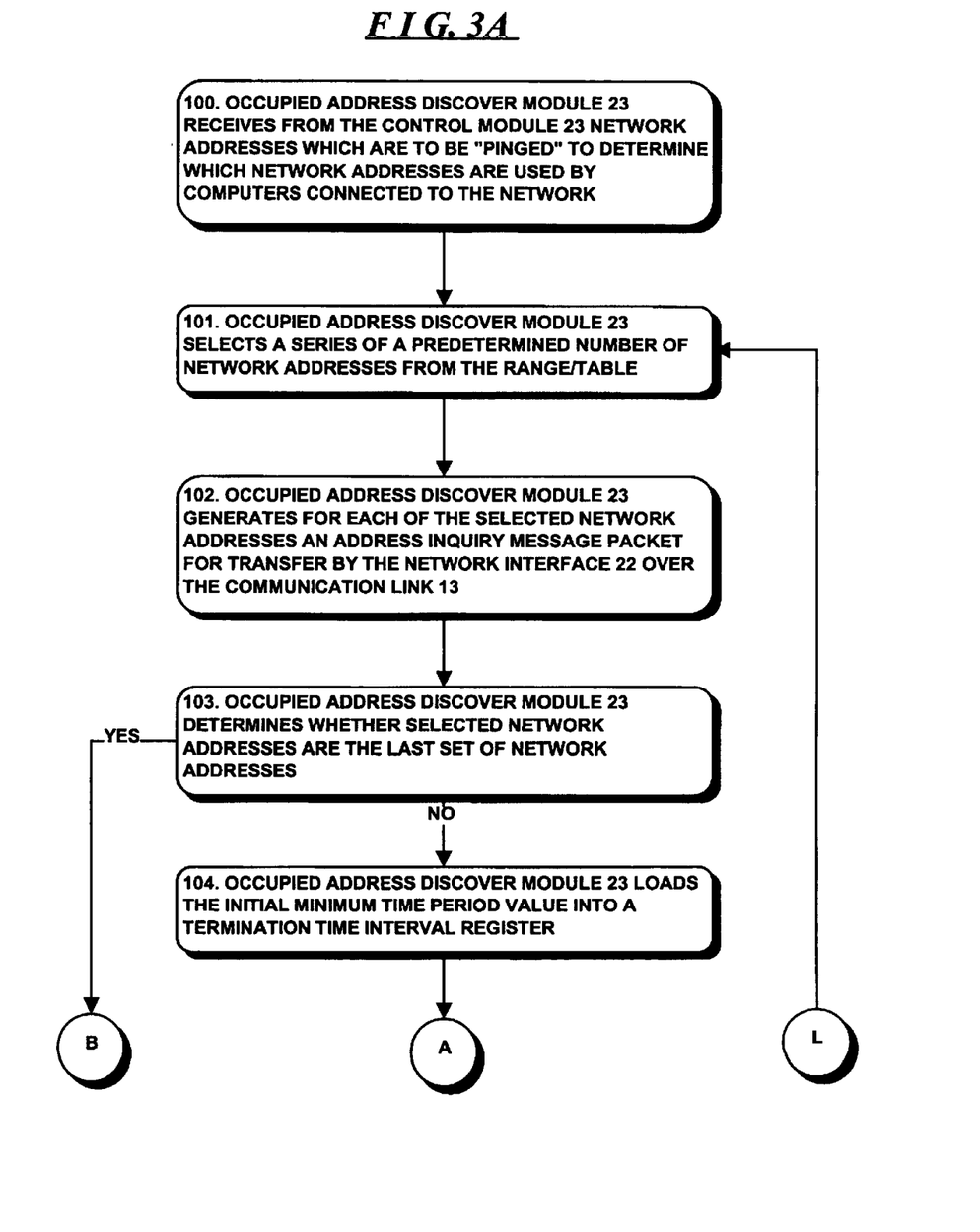
FIGS. 3A through 3F together comprise a flowchart useful in understanding operations performed by the computer depicted in FIG. 2 in connection with determining network addresses of the other computers and other devices connected in the network depicted in FIG. 1.
Figure 3B:
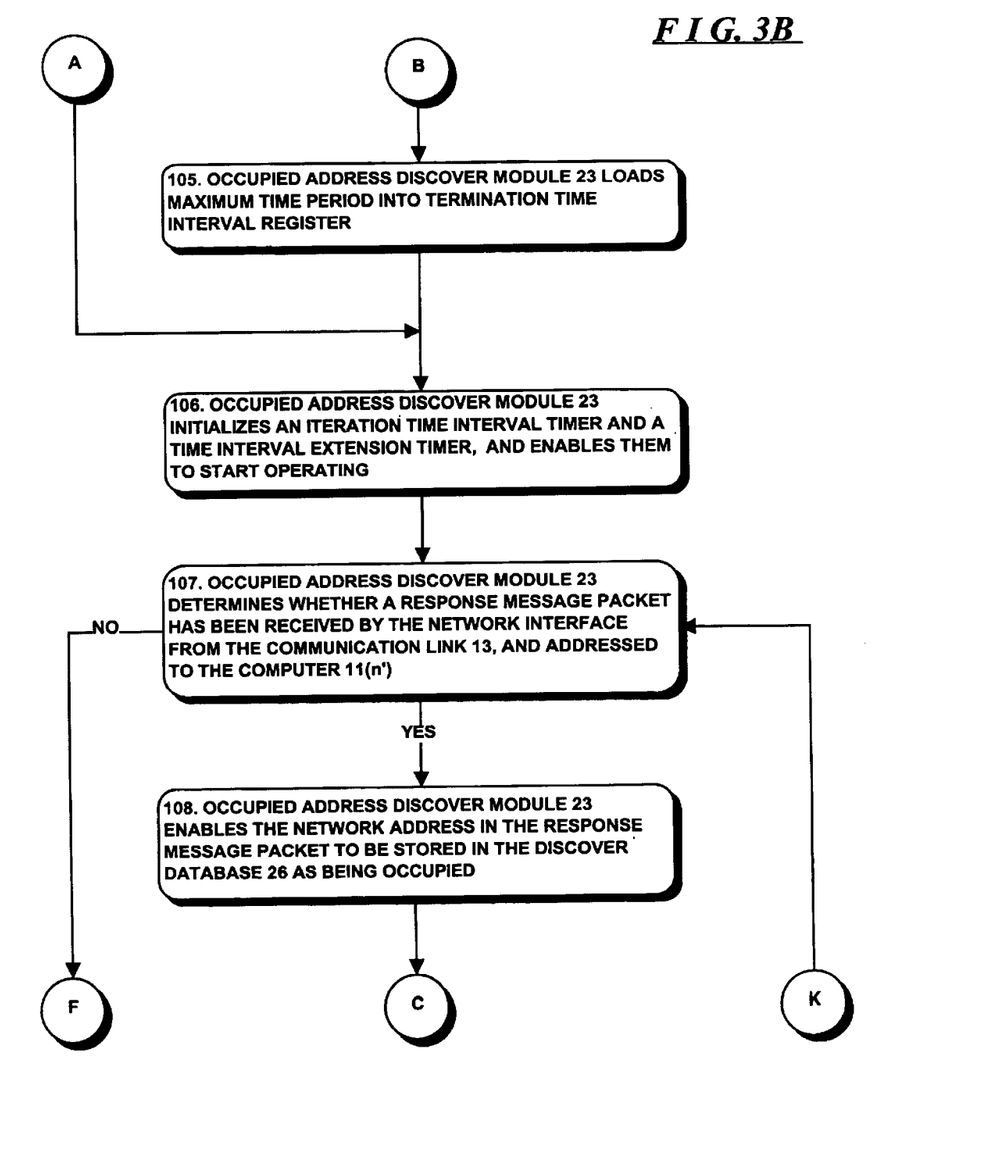
Figure 3C:
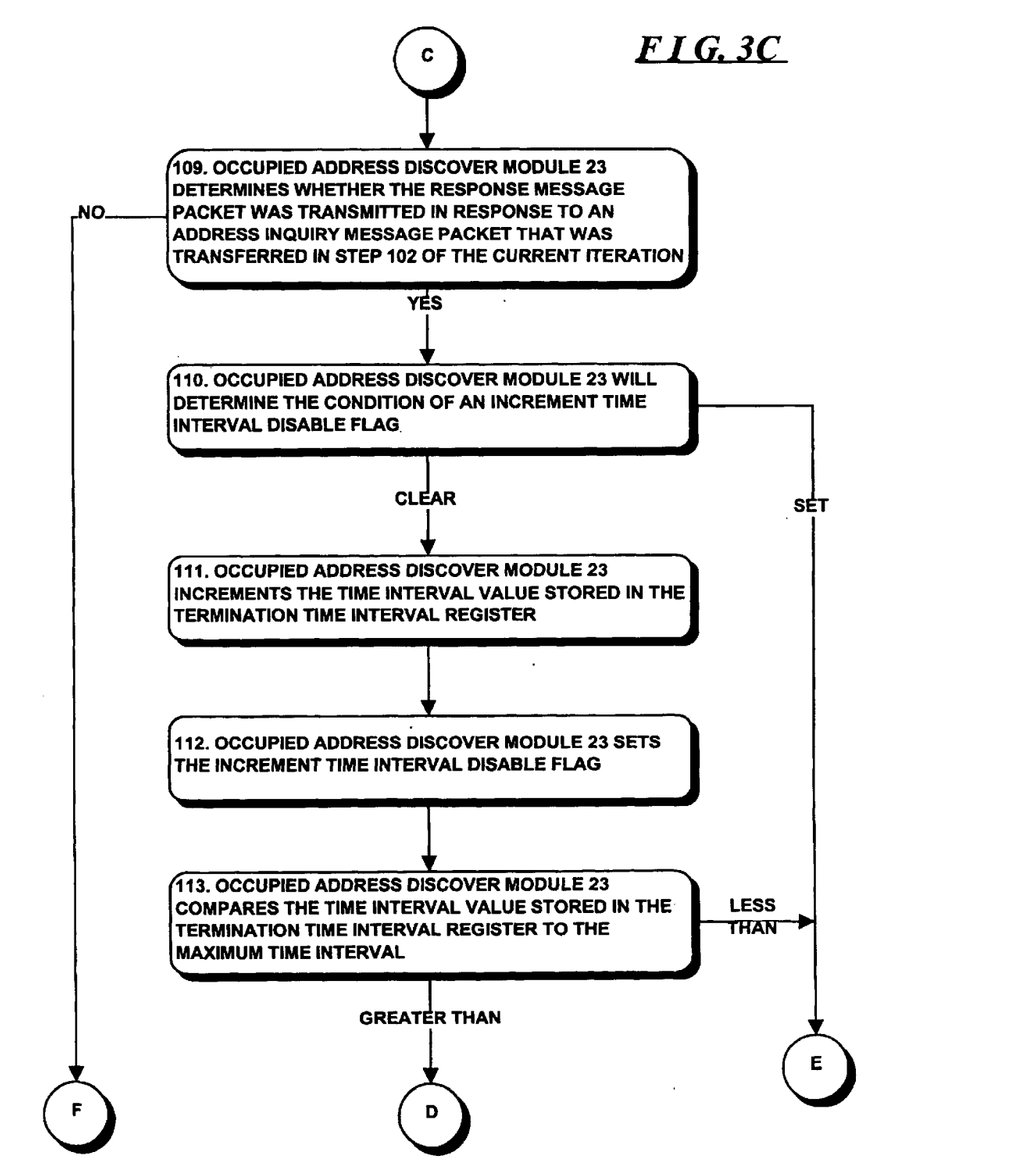
Figure 3D:
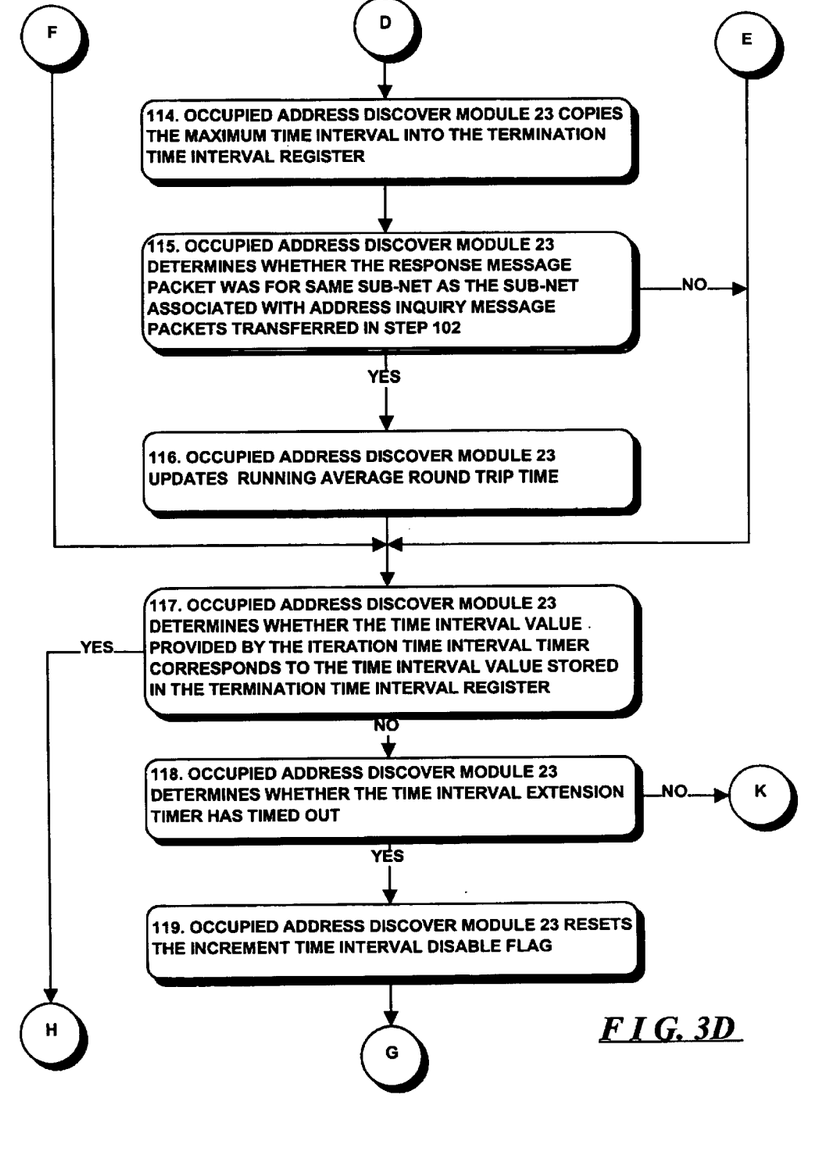
Figure 3E:
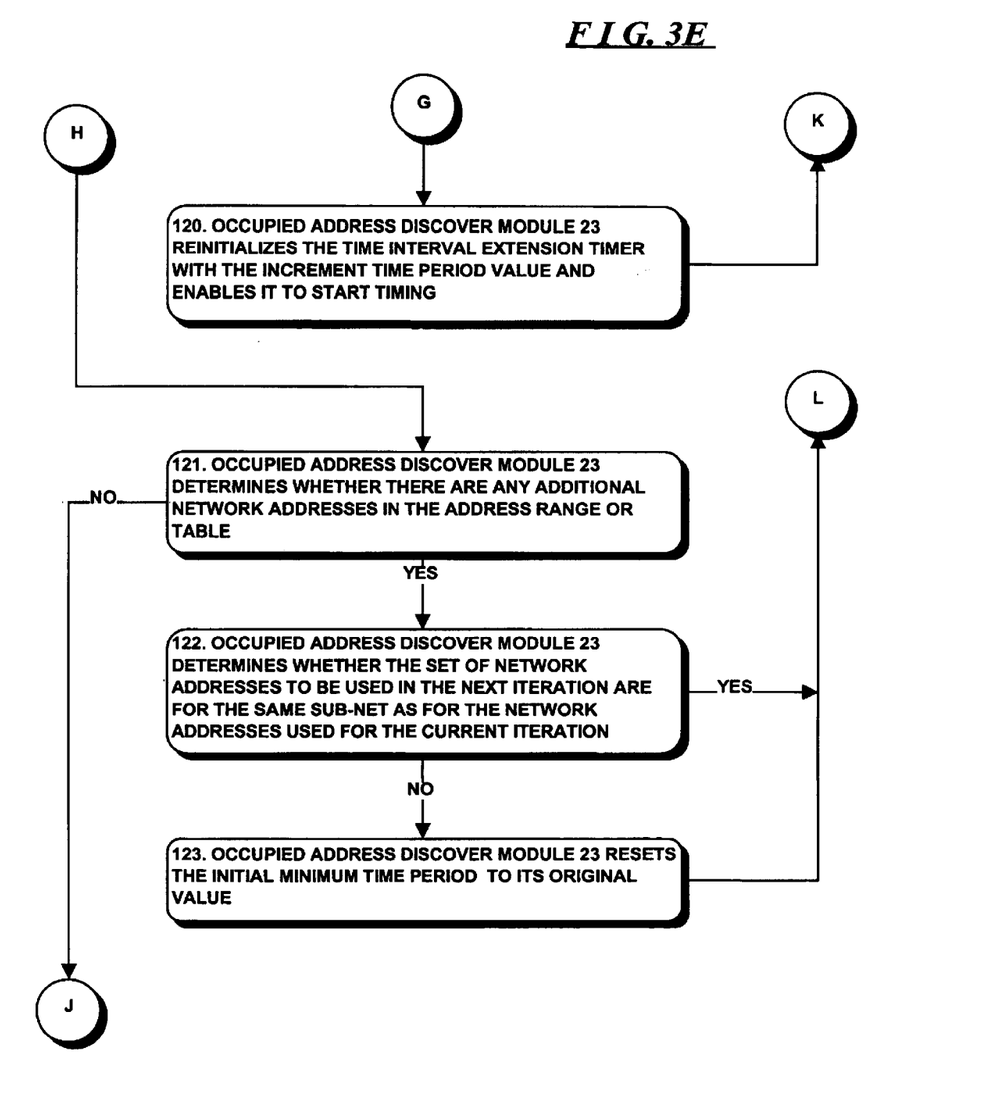
Figure 3F:
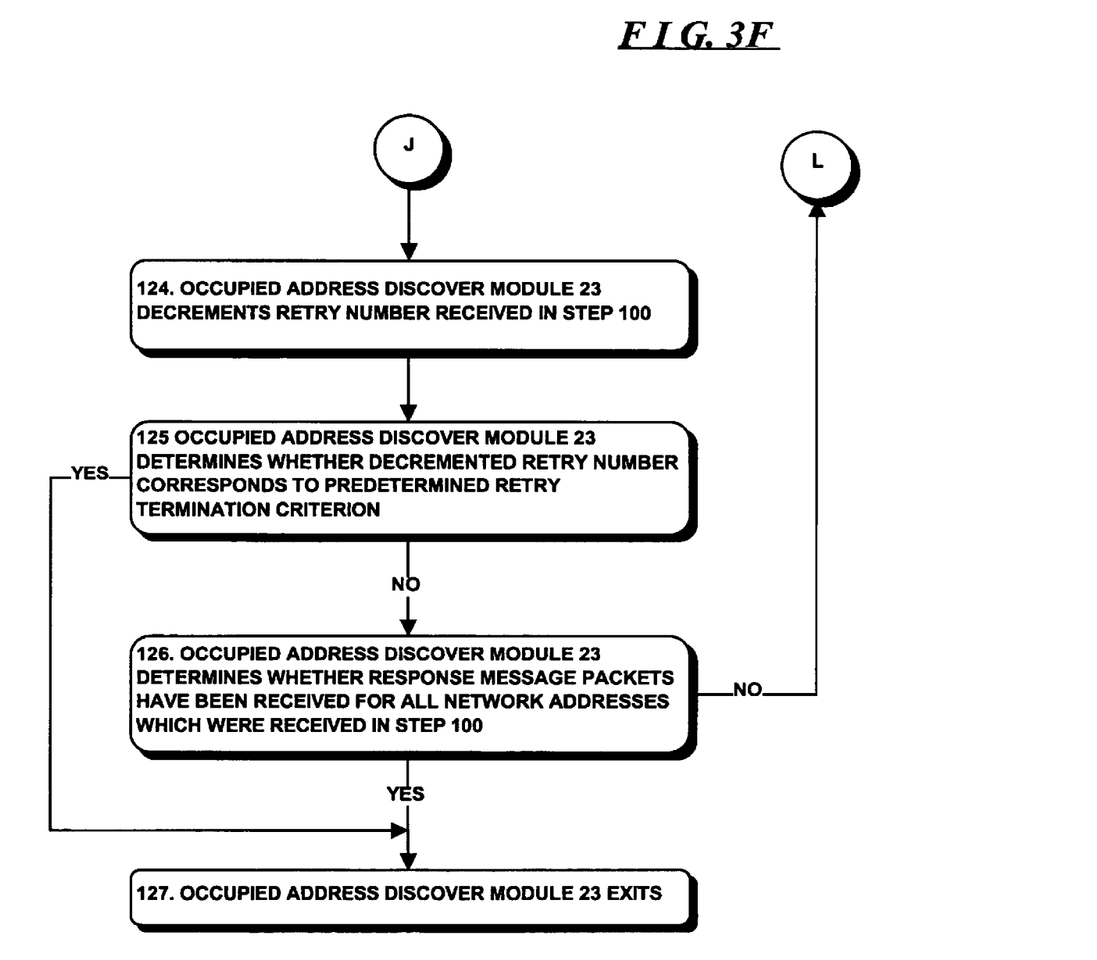

As noted above, operations performed by the occupied address discover module 23 in determining the occupied network addresses in the network address space will be described in connection with the flowchart depicted on FIGS. 3A through 3F. With reference to FIG. 3F, after the occupied address discover module 23 receives from the control module 23 either a range of the network address space (which may include the entire network address space) or a table of network addresses which are to be "pinged" to determine which network addresses are used by computers connected to the network, a retry number, and the minimum, incremental and maximum time periods (step 100), it (that is, the occupied address discover module 23) begins one or more retry operations as determined by the retry number received in step 100 to determine which network addresses are occupied.

In each retry operation, the occupied address discover module 23 performs one or more iterations, with the number of iterations being determined by the number of network addresses in the range or table and the number of network addresses for which address inquiry message packets are to be generated in each iteration. In each iteration, the occupied address discover module 23 initially selects a series of a predetermined number of network addresses from the range/table for which response message packets have not yet been received (step 101) and generates for each of the selected network addresses an address inquiry message packet for transfer by the network interface 22 over the communication link 13 (step 102). Each address inquiry message packet includes one of the selected network addresses and a time stamp; the time stamp will be used in determining the running average round-trip time for the use in adjusting the initial minimum time period described above.

After the address inquiry message packets have been transferred, the occupied address discover module 23 determines whether the network addresses for which the address inquiry message packets were generated in step 102 is for the last set of network addresses in the range/table for the retry operation (step 103). If the occupied address discover module 23 makes a negative determination in step 103, it will load the initial minimum time period value into a termination time interval register (step 104). On the other hand, if the occupied address discover module 23 makes a positive determination in step 103, it will load the maximum time period value into the termination time interval register (step 105). The time period value stored in the termination time interval register will be used in determining the time period for the iteration, and by loading the maximum time period value into the termination time value register for the last iteration of the retry operation (reference step 105), that will ensure that the maximum time will be allowed to receive response message packets during retry operation.

After the address inquiry message packets have been transferred, the occupied address discover module 23 initializes two timers, namely, an iteration time interval timer and a time interval extension timer, and enables them to start operating (step 106). The iteration time interval timer will be used in determining when the iteration is to end. The time interval extension timer will be used in determining when the initial minimum time period or each incremental time period has ended; this will be used in controlling extension of the iteration time period to ensure that the iteration time period is extended only once during the initial minimum time period or each incremental time period even if multiple response message packets are received during the initial minimum time period or respective incremental time period. The iteration time interval timer may, for example, be initialized at zero and enabled to increment, and the time interval extension timer may be initialized at the initial minimum time period and be enabled to decrement.

After the occupied address discover module 23 has started the iteration time interval timer and the time interval extension timer in step 104, if it (that is, the occupied address discover module 23) determines that a response message packet has been received by the network interface from the communication link 13, and addressed to the computer 11(n') (step 107), it (that is, occupied address discover module 23) will enable an indication that the network address in the response message packet is occupied to be stored in the discover database 26 (step 108). After a network address has been indicated as being occupied, the other modules of the network discover system 20, including the port mapper discover module 24 can perform operations therewith as described above. Following step 108, the occupied address discover module 23 can determine whether the response message packet was transmitted in response to an address inquiry message packet that was transferred in step 102 of the current iteration (step 109). If the occupied address discover module makes a positive determination in step 109, it will determine the condition of an increment time interval disable flag (step 110), which will control incrementing the iteration time interval for the iteration.

If the occupied address discover module 23 determines in step 110 that the increment time interval disable flag is set, which will occur if the response message packet received in step 107 is the first response message packet that the occupied address discover module 23 received during the respective initial minimum time interval or current incremented time interval, that was transmitted in response to an address inquiry message packet that had been transferred in step 102 of the current iteration, the occupied address discover module 23 will increment the time interval value stored in the termination time interval register (step 111) and set the increment time interval disable flag (step 112). In addition, the occupied address discover module 23 will compare the time interval value stored in the termination time interval register to the maximum time interval (step 113) and, if the time interval value stored in the termination time interval register is greater than the maximum time interval, copy the maximum time interval into the termination time interval register (step 114). The increment time interval disable flag is provided to ensure that the time interval value stored in the termination time interval register is incremented only once for response message packets received during the initial minimum time period or respective incremented time period for the iteration. Step 114 is provided to ensure that the time interval for the iteration is limited to the maximum time interval.

If the occupied address discover module 23 determines in step 110 that the increment time interval disable flag is clear, which will occur if the response message packet received in step 107 is not the first response message packet that the occupied address discover module 23 received during the respective initial minimum time interval or current incremented time interval, that was transmitted in response to an address inquiry message packet that had been transferred in step 102 of the current iteration, it will skip steps 111 through 114, to avoid incrementing the time interval value stored in the termination time interval register.

Returning to step 109, if the occupied address discover module 23 makes a negative determination in that step, indicating that a response message packet had been received, but that the response message packet was not in response to an address inquiry message packet that was transferred in step 102 of the current iteration, or step 114, the occupied address discover module 23 will determine whether the response message packet was for the same sub-net as the sub-net associated with the address inquiry message packets which were transferred in step 102 (step 115). If the occupied address discover module 23 makes a positive determination in step 115, it will update a running average round-trip time based on the time stamp in the response message packet (which is a copy of the time stamp in the address inquiry message packet for which the response message packet is a response) and the time at which the response message packet was received by the computer 11(n') (step 116).

Following
(i) step 116;
(ii) step 115, if the occupied address discover module 23 makes a negative determination in that step, indicating that the response message packet was for the same sub-net as the sub-net associated with the address inquiry message packets which were transferred in step 102;
(iii) step 113, if the occupied address discover module 23 incremented the time interval value in the termination time interval register in that step;
(iv) step 110, if the occupied address discover module 23 determined in that step that the increment time interval disable flag is set, indicating that the time interval value in the termination time interval register is not to be incremented, or
(v) step 107 if the occupied address discover module 23 makes a negative determination in that step, indicating that a response message packet has not been received following activation of the counter,
the occupied address discover module 23 will determine whether the time interval value provided by the iteration time interval timer corresponds to the time interval value stored in the termination time interval register (step 117). If the occupied address discover module 23 makes a negative determination, that is, if it determines that the time interval value provided by the timer is less than the time interval value provided by the termination time interval register, it (that is, the occupied address discover module 23) will determine whether the time interval extension timer has timed out (step 118). If the occupied address discover module 23 makes a positive determination in step 118, that is, if it determines that the time interval extension timer has timed out, it will reset the increment time interval disable flag (step 119) and re-initialize the time interval extension timer with the increment time period value and enable it to start decrementing (step 120). By resetting the increment time interval disable flag in step 119, the occupied address discover module 23 may again increment the time period value for the iteration in the termination time period register in step 111 if another response message packet is received that was transmitted during step 102 of the current iteration.

Following
(i) step 120, or
(ii) step 118, if a negative determination is made in that step, indicating that the respective initial minimum time period or incremental time period has not passed,
the occupied address discover module 23 will return to step 107 to wait for another response message packet.

The occupied address discover module 23 will iteratively perform steps 107 through 120 until it determines, in step 117, that the time interval value provided by the timer corresponds to the time interval value stored in the termination time interval register. When that occurs, the iteration terminates and the occupied address discover module 23 prepares to perform another iteration in connection with a next set of network addresses, if any, in the network address range or table. In those operations, the occupied address discover module 23 will initially determine whether there are any additional network addresses in the address range or table (step 121). If the occupied address discover module 23 makes a positive determination in step 121, which will occur if there are additional network addresses in the address range or table, it will determine whether the set of network addresses to be used in the next iteration are for the same sub-net as for the network addresses used for the current iteration (step 122). As indicated above, the network addresses to be used in the next iteration will be for the same sub-net if predetermined ones of the bits of the network address represent the same value. If the occupied address discover module 23 determines in that step that the set of network addresses to be used in the next iteration are not for the same sub-net as for the network addresses used for the current iteration, it will reset the initial minimum time period to its original value (step 123) and return to step 101 to begin the next iteration.

In addition, returning to step 121, if the occupied address discover module 23 makes a negative determination in that step, all of the network addresses have been used in address inquiry message packets for the retry operation. If the occupied address discover module 23 makes a negative determination in step 121, it will determine whether to perform another retry operation. Initially, the occupied address discover module 23 will decrement the retry number received in step 100 (step 124), and determine whether the decremented retry number corresponds to a predetermined retry termination criterion (step 125). If the occupied address discover module 23 makes a negative determination in step 125, that is, if it determines that the decremented retry number does not correspond to the retry termination criterion, it will then determine whether it has received response message packets in connection with all of the network addresses in the range/table that it received in step 100 (step 126). If the occupied address discover module 23 makes a negative determination instep 126, it will return to step 101 to perform another retry operation.

The occupied address discover module 23 will perform steps 101 through 126 through one or more retry operations, until it makes either (i) a positive determination in step 126, indicating that it had received response message packets for all of the network addresses in the range or table that it received in step 100, or (ii) a determination in step 125 that the decremented retry number corresponds to the predetermined retry termination criterion.

In either case (i) or (ii), the occupied address discover module 23 will terminate operations (step 127).

It will be appreciated that numerous modifications may be made to the network discover arrangement and system as described above in connection with FIGS. 1 through 3F. For example, although the network discover system has been described in connection with a client computer 11(n'), it will be appreciated that such a system may also be used in connection with a server computer such as computer 12, or a computer which communicates with other computers on a peer-to-peer basis. In addition, such a system may also be used in connection with non-computer resources and devices which are connected in the network.

Further, although the network discovery system has been described as comprising components 23 through 25 for performing respective operations as described above, it will be appreciated that a network discovery system in connection with the invention may have a subset of these components or additional components. In addition, although the occupied address discover module 23 has been described as providing adaptable-length time intervals for respective iterations, to facilitate lengthening of the time period of an iteration both when the computer 11(n') is transferring address inquiry message packets for network addresses in a populated region of the network address space (reference steps 107 through 112 and 116 through 119), and for network addresses in a populated region for which the sub-net is located relatively distant from the computer 11(n'), with correspondingly-increased propagation delays (reference steps 113 through 115 and 121 through 124), it will be appreciated that the occupied address discover module 23 may only lengthen the time period for one of these.

It will be appreciated that a system in accordance with the invention can be constructed in whole or in part from special purpose hardware or a general purpose computer system, or any combination thereof, any portion of which may be controlled by a suitable program. Any program may in whole or in part comprise part of or be stored on the system in a conventional manner, or it may in whole or in part be provided in to the system over a network or other mechanism for transferring information in a conventional manner. In addition, it will be appreciated that the system may be operated and/or otherwise controlled by means of information provided by an operator using operator input elements (not shown) which may be connected directly to the system or which may transfer the information to the system over a network or other mechanism for transferring information in a conventional manner.

The foregoing description has been limited to a specific embodiment of this invention. It will be apparent, however, that various variations and modifications may be made to the invention, with the attainment of some or all of the advantages of the invention. It is the object of the appended claims to cover these and such other variations and modifications as come within the true spirit and scope of the invention.

What is claimed as new and desired to be secured by Letters Patent of the United States is:

1. An occupied address discover system for use in connection with a computer, comprising:

A an address inquiry message packet generator module configured to enable the computer to transmit address inquiry message packets over a network in one or more iterations, each address inquiry message packet including a network address, the address inquiry message packet generator module being configured to enable the computer to transmit address inquiry message packets for a selected number of network addresses during each iteration; and B. an iteration control module configured to control the timing of successive iterations of transmission of the address inquiry message packets by the computer in relation to reception by the computer of response message packets responding to the address inquiry message packets wherein the iteration control module controls the timing of successive iterations to provide at least a selected minimum time period for each iteration.

2. An occupied address discover system as defined in claim 1 in which the iteration control module is configured to control the timing of each successive iterations in relation to reception by the computer of the response message packets responding to the address inquiry message packets transmitted during each respective iteration.

3. An occupied address discover system as defined in claim 1 in which the iteration control module is further configured to provide an extended time period longer than the selected at least one minimum time period if the computer receives at least one response message packet responding to the address inquiry message packets during the selected at least one minimum time period.

4. An occupied address discover system as defined in claim 3 in which the iteration control module is further configured to provide the extended time period if the computer receives at least one response message packet responding to at least one of the address inquiry message packets which were transmitted by the computer during the iteration.

5. An occupied address discover system as defined in claim 1 in which the iteration control module is further configured to provide the extended time period as including at least one incremental time period following the selected at least one minimum time period.

6. An occupied address discover system as defined in claim 5 in which the iteration control module is further configured to provide the extended time period comprising a further incremental time period if the computer receives at least one response message packet responding to the address inquiry message packets during the at least one incremental time period.

7. An occupied address discover system as defined in claim 3 in which the iteration control module is further configured to provide the extended time period up to a selected maximum time period.

8. An occupied address discover system as defined in claim 1 in which the iteration control module is configured to adjust the selected at least one minimum time period in relation to an average round-trip time representative of a time delay between transmission of address inquiry message packets and reception of respective response message packets in response thereto.

9. An occupied address discover system for use in connection with a computer comprising:

A. an address inquiry message packet generator module configured to enable the computer to transmit address inquiry message packets over a network in one or more iterations, each address inquiry message packet including a network address, the address inquiry message packet generator module being configured to enable the computer to transmit address inquiry message packets for a selected number of network addresses during each iteration;

B. an iteration control module configured to control the timing of successive iterations of transmission of the address inquiry message packets by the computer in relation to reception by the computer of response message packets responding to the address inquiry message packets; and C. a response message packet reception module configured to, in response to reception by the computer of a response message packet in response to a respective one of the address inquiry message packets transmitted by the computer, generate an occupied address indication for the network address for the respective one of the address inquiry message packets.

10. An occupied address discover system as defined in claim 9 further comprising a selected characteristic discover module configured to perform a selected characteristic discover operation in connection with network addresses for which the response message packet reception module enables generation of an occupied address indication.

11. An occupied address discover system as defined in claim 10 which one selected characteristic is whether a device connected in the network which uses a network address for which the occupied address indication was generated is using a port mapper.

12. A method of enabling a computer to discover occupied addresses, comprising the steps of:

A. enabling the computer to transmit address inquiry message packets over a network in one or more iterations, each address inquiry message packet including a network address, in each iteration the computer being enabled to transmit address inquiry message packets for a selected number of network addresses during each iteration; and B. controlling the timing of successive iterations of transmission of address inquiry message packets by the computer in relation to reception by the computer of response message packets responding to the address inquiry message packets so as to provide at least a selected minimum time period for each iteration.

13. A method as defined in claim 12 in which the iteration control step includes the step of controlling the timing of each successive iterations in relation to reception by the computer of response message packets responding to address inquiry message packets transmitted during each respective iteration.

14. A method as defined in claim 12 in which the iteration control step includes the step of providing an extended time period longer than the selected at least one minimum time period if the computer receives at least one response message packet responding to the address inquiry message packets during the selected at least one minimum time period.

15. A method as defined in claim 14 in which the iteration control step includes the step of providing the extended time period if the computer receives at least one response message packet responding to at least one of the address inquiry message packets which were transmitted by the computer during the iteration.

16. A method as defined in claim 12 in which the iteration control step includes the step of providing the extended time period as including at least one incremental time period following the selected at least one minimum time period.

17. A method as defined in claim 16 in which the iteration control step includes the step of providing the extended time period comprising a further incremental time period if the computer receives at least one response message packet responding to the address inquiry message packets during the at least one incremental time period.

18. A method as defined in claim 14 in which the iteration control step includes the step of providing the extended time period up to a selected maximum time period.

19. A method as defined in claim 12 in which the iteration control step includes the step of adjusting the selected at least one minimum time period in relation to an average round-trip time representative of a time delay between transmission of address inquiry message packets and reception of respective response message packets in response thereto.

20. A method of enabling a computer to discover occupied addresses, comprising the steps of:

A. enabling the computer to transmit address inquiry message packets over a network in one or more iterations, each address inquiry message packet including a network address, in each iteration the computer being enabled to transmit address inquiry message packets for a selected number of network addresses during each iteration;

B. controlling the timing of successive iterations of transmission of address inquiry message packets by the computer in relation to reception by the computer of response message packets responding to the address inquiry message packets; and C. in response to reception by the computer of a response message packet in response to a respective one of the address inquiry message packets transmitted by the computer, enabling the computer to generate an occupied address indication for the network address for the respective one of the address inquiry message packets.

21. A method as defined in claim 20 further comprising a selected characteristic discover step of enabling the computer to perform a selected characteristic discover operation in connection with network addresses for which the response message packet reception module enables generation of an occupied address indication.

22. A method as defined in claim 21 in which one selected characteristic is whether a device connected in the network which uses a network address for which the occupied address indication was generated is using a port mapper.

23. An occupied address discover computer program product for use in connection with a computer, comprising a computer-readable medium having encoded thereon:

A. an address inquiry message packet generator module configured to enable the computer to transmit address inquiry message packets over a network in one or more iterations, each address inquiry message packet including a network address, the address inquiry message packet generator module being configured to enable the computer to transmit address inquiry message packets for a selected number of network addresses during each iteration; and B. an iteration control module configured to enable the computer to control the timing of successive iterations of transmission of address inquiry message packets by the computer in relation to reception by the computer of response message packets responding to the address inquiry message packets wherein the iteration control module enables the computer to control the timing of successive iterations to provide at least a selected minimum time period for each iteration.

24. An occupied address discover computer program product as defined in claim 23 in which the iteration control module is configured to enable the computer to control the timing of each successive iterations in relation to reception by the computer of response message packets responding to address inquiry message packets transmitted during each respective iteration.

25. An occupied address discover computer program product as defined in claim 23 in which the iteration control module is further configured to enable the computer to provide an extended time period longer than the selected at least one minimum time period if the computer receives at least one response message packet responding to the address inquiry message packets during the selected at least one minimum time period.

26. An occupied address discover computer program product as defined in claim 25 in which the iteration control module is further configured to enable the computer to provide the extended time period if the computer receives at least one response message packet responding to at least one of the address inquiry message packets which were transmitted by the computer during the iteration.

27. An occupied address discover computer program product as defined in claim 23 in which the iteration control module is further configured to enable the computer to provide the extended time period as including at least one incremental time period following the selected at least one minimum time period.

28. An occupied address discover computer program product as defined in claim 27 in which the iteration control module is further configured to enable the computer to provide the extended time period comprising a further incremental time period if the computer receives at least one response message packet responding to the address inquiry message packets during the at least one incremental time period.

29. An occupied address discover computer program product as defined in claim 25 in which the iteration control module is further configured to enable the computer to provide the extended time period up to a selected maximum time period.

30. An occupied address discover computer program product as defined in claim 23 in which the iteration control module is configured to enable the computer to adjust the selected minimum time period in relation to an average round-trip time representative of a time delay between transmission of address inquiry message packets and reception of respective response message packets in response thereto.

31. An occupied address discover computer program product for use in connection with a computer, comprising a computer-readable medium having encoded thereon:
   A. an address inquiry message packet generator module configured to enable the computer to transmit address inquiry message packets over a network in one or more iterations, each address inquiry message packet including a network address, the address inquiry message packet generator module being configured to enable the computer to transmit address inquiry message packets for a selected number of network addresses during each iteration;
   B. an iteration control module configured to enable the computer to control the timing of successive iterations of transmission of address inquiry message packets by the computer in relation to reception by the computer of response message packets responding to the address inquiry message packets; and
   C. a response message packet reception module configured to enable the computer to, in response to reception by the computer of a response message packet in response to a respective one of the address inquiry message packets transmitted by the computer, generate an occupied address indication for the network address for the respective one of the address inquiry message packets.

32. An occupied address discover computer program product as defined in claim 31 further comprising a selected characteristic discover module configured to enable the computer to perform a selected characteristic discover operation in connection with network addresses for which the response message packet reception module enables generation of an occupied address indication.

33. An occupied address discover computer program product as defined in claim 32 in which one selected characteristic is whether a device connected in the network which uses a network address for which the occupied address indication was generated is using a port mapper.

* * * * *